United States Patent
Schiller

[15] 3,647,167
[45] Mar. 7, 1972

[54] FLUID DELIVERY SYSTEM FOR AIRCRAFT WINDSHIELDS

[72] Inventor: Teddy M. Schiller, Huntington Beach, Calif.
[73] Assignee: Purex Corporation, Ltd., Lakewood, Calif.
[22] Filed: June 5, 1970
[21] Appl. No.: 43,859

[52] U.S. Cl. .................................................. 244/121
[51] Int. Cl. ....................................................B64c 1/14
[58] Field of Search ...........................244/121; 137/113

[56] References Cited

UNITED STATES PATENTS

| | | | |
|---|---|---|---|
| 3,131,708 | 5/1964 | Knight | 137/113 |
| 3,513,751 | 5/1970 | Escobosa | 137/113 |
| 3,550,613 | 12/1970 | Barber | 137/113 |
| 3,559,928 | 2/1971 | Dohmeyer | 244/121 |
| 2,849,760 | 9/1958 | Boeke et al. | 244/121 |

*Primary Examiner*—Milton Buchler
*Assistant Examiner*—Steven W. Weinrieb
*Attorney*—White, Haefliger and Bachand

[57] ABSTRACT

A fluid delivery system useful for delivery of rain repellent fluid to aircraft windshields including first and second tanks of fluid under pressure, a valve to control first tank delivery to a discharge line and adapted to close when discharge line pressure is greater than the first tank pressure and means responsive to first and second tank pressure, e.g., to a predetermined ratio of such tank pressures to control second tank discharge to the line.

8 Claims, 3 Drawing Figures

INVENTOR.
TEDDY M. SCHILLER.
By White, Haefliger & Bachand
ATTORNEYS.

3,647,167

FLUID DELIVERY SYSTEM FOR AIRCRAFT WINDSHIELDS

BACKGROUND OF THE INVENTION

1. Field of the Invention

This invention has to do with a system for alternate delivery of fluid from self-pressurized tanks to a fluid utilization device in a predetermined manner providing adequate pressure at the device for effective use during service periods. In a particular aspect, the invention is concerned with regulating the delivery of rain repellent fluid to aircraft windshields from one of two self-pressurized tanks in an alternate manner dependent on the ratio of pressures between the two tanks and independent of the discharge line pressure.

2. Description of the Prior Art

The regulation of fluid flow from self-pressurized containers, or tanks, with check valves responsive to their respective containers and discharge line pressure is known. In the past, however, these expedients, particularly as utilized in the aircraft windshield rain repellent field have alternated or combined fluid supply to the windshield and continued operation has sometimes resulted in unknowingly badly depleted supplies, and thus suddenly inadequate fluid pressures for effective application to the windshield.

SUMMARY OF THE INVENTION

It is a major objective of the present invention to provide a fluid delivery system in which fluid delivery from a second tank supply is controlled by means responsive to pressure in the first tank and pressure in the second tank, and particularly to a predetermined ratio of second tank fluid pressure to first tank fluid pressure.

Accordingly, the invention contemplates a fluid delivery system including a first tank of fluid under pressure, a valve to control first tank delivery to a discharge line and adapted to close when discharge line pressure is greater than the first tank pressure, and means responsive to first tank pressure to control second tank discharge to the line. In general, the last mentioned means includes valve means responsive to second tank pressure relatively higher than first tank pressure to permit second tank discharge into the line and independent of discharge line pressure. The valve means may include a valve member and means communicating first tank fluid pressure to the valve member such as a fluid receiving bellows interiorly in open communication with the first tank fluid upstream of its control valve and having a free end operatively connected to one side of the valve member. The valve means may further include an aneroid, second bellows having a free end operatively connected to the valve member opposite the fluid receiving bellows for urging the valve member cooperatively with the last mentioned bellows.

In preferred embodiments, the second tank fluid delivery control includes valve means responsive to a predetermined ratio of second tank pressure to first tank pressure to permit second tank discharge, means communicating to one side of the valve member a force proportional to the first tank pressure and means communicating to the opposite side of the valve member a force proportional to the second tank pressure; the forces being differently proportional to their respective tank pressures in the ratio predetermined for operating the valve member. The force communicating means in these embodiments may include the above-described fluid receiving bellows having a predetermined effective diameter equal to the effective seat diameter of the opening controlled by the valve member, proportioning the force on the valve member from first tank fluid pressure, and a surface on the opposite side of the valve member in open communication with the second tank fluid and having a predetermined effective surface area proportioning the force from second tank fluid pressure on the valve member opposite side. The ratio of the bellows effective area to the valve member effective surface area thus defining the predetermined pressure ratio which actuates the valve member. In this embodiment, an aneroid bellows may be provided as above-described to bias the valve member cooperatively with the fluid receiving bellows.

There may also be included means releasably blocking return movement of the valve member following second tank discharge into the line.

In a fluid delivery system for aircraft windshields, a conduit to the windshield is provided as the discharge line into which the fluid is delivered from the first and second tanks, controlled as described above.

BRIEF DESCRIPTION OF THE DRAWINGS

The invention will be further described as to an illustrative embodiment with reference to the attached drawings wherein.

DESCRIPTION OF THE PREFERRED EMBODIMENT

Figure 1:
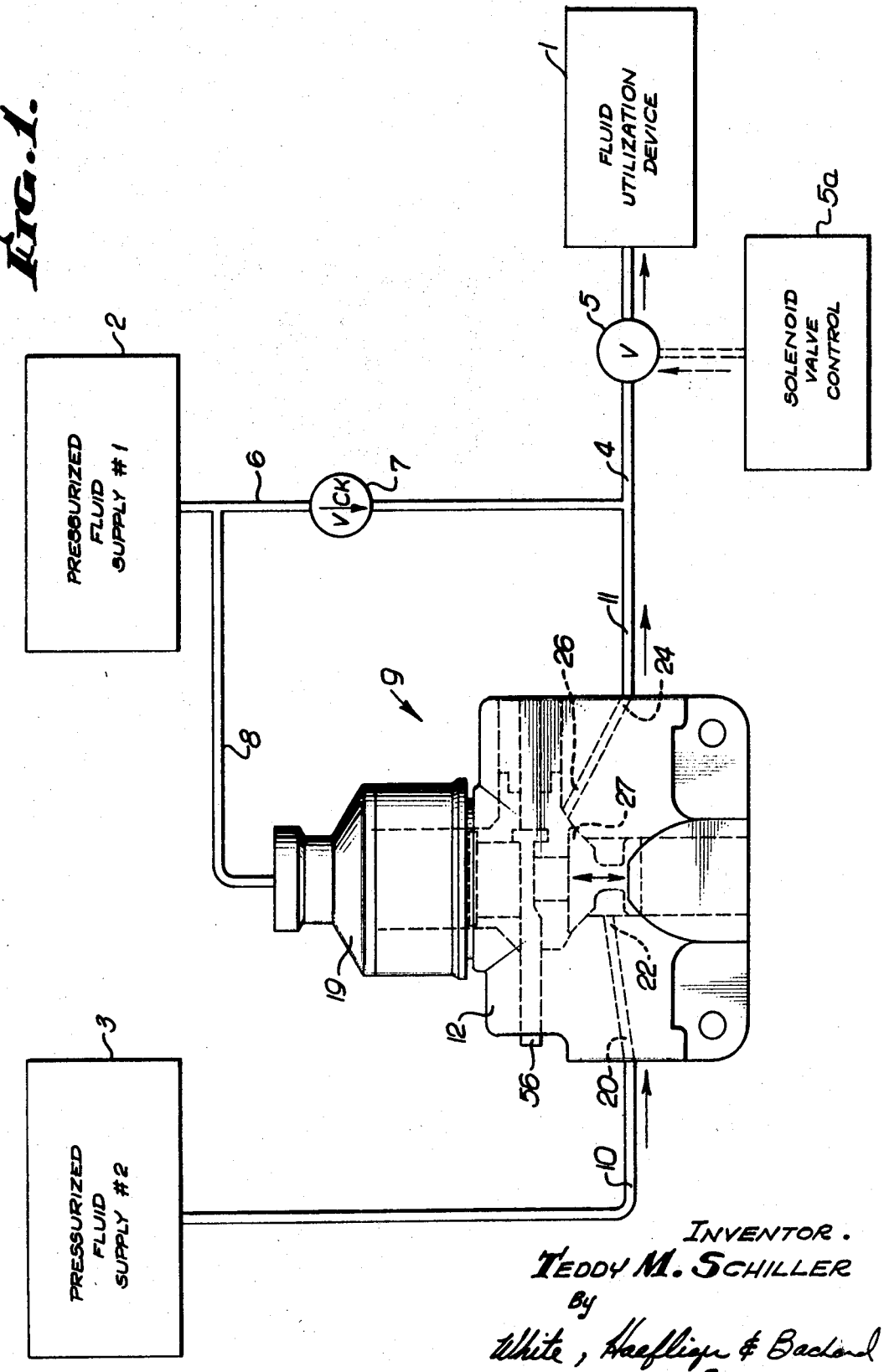
FIG. 1 is a schematic view of a fluid delivery system.

In FIG. 1, a fluid delivery system is shown including fluid utilization device 1. Device 1 is representative of devices requiring for operation periodic delivery of fluid under pressure, e.g., a nozzle for application to a windshield of rain repellent fluid. The device 1 is connected to a supply of fluid e.g., rain repellent fluid, under pressure, contained in tanks 2 and 3. The fluid in tank 2 is denominated Supply No. 1 since it is first delivered to the device 1; the fluid in tank 3, Supply No. 2. Tanks 2 and 3 are arranged to empty into conduit forming a discharge line 4 for delivery to device 1. An on-off control is provided across the discharge line 4 including valve 5 and solenoid control 5a for the valve.

Tank 2 communicates with discharge line 4 through line 6 provided with a check valve 7 against reverse flow into the tank. Line 8 communicates fluid from line 6, upstream of the valve 7 to tank 3 fluid flow control valve 9, providing a pilot pressure in the valve 9 for purposes to appear.

Tank 3 communicates with discharge line 4 through line 10, valve 9 and line 11 so that the valve controls fluid flow from tank 3 to the discharge line. In FIG. 1, the valve 9 is shown closed so that fluid demand at device 1 is supplied from Supply No. 1 in tank 2. The present invention provides means for substituting Supply No. 2 fluid for Supply No. 1 fluid in a predetermined manner responsive to the ratio of pressure in tank 3 to pressure in tank 2 and independent of pressure in discharge line 4, through the operation of valve 9.

Figure 2:
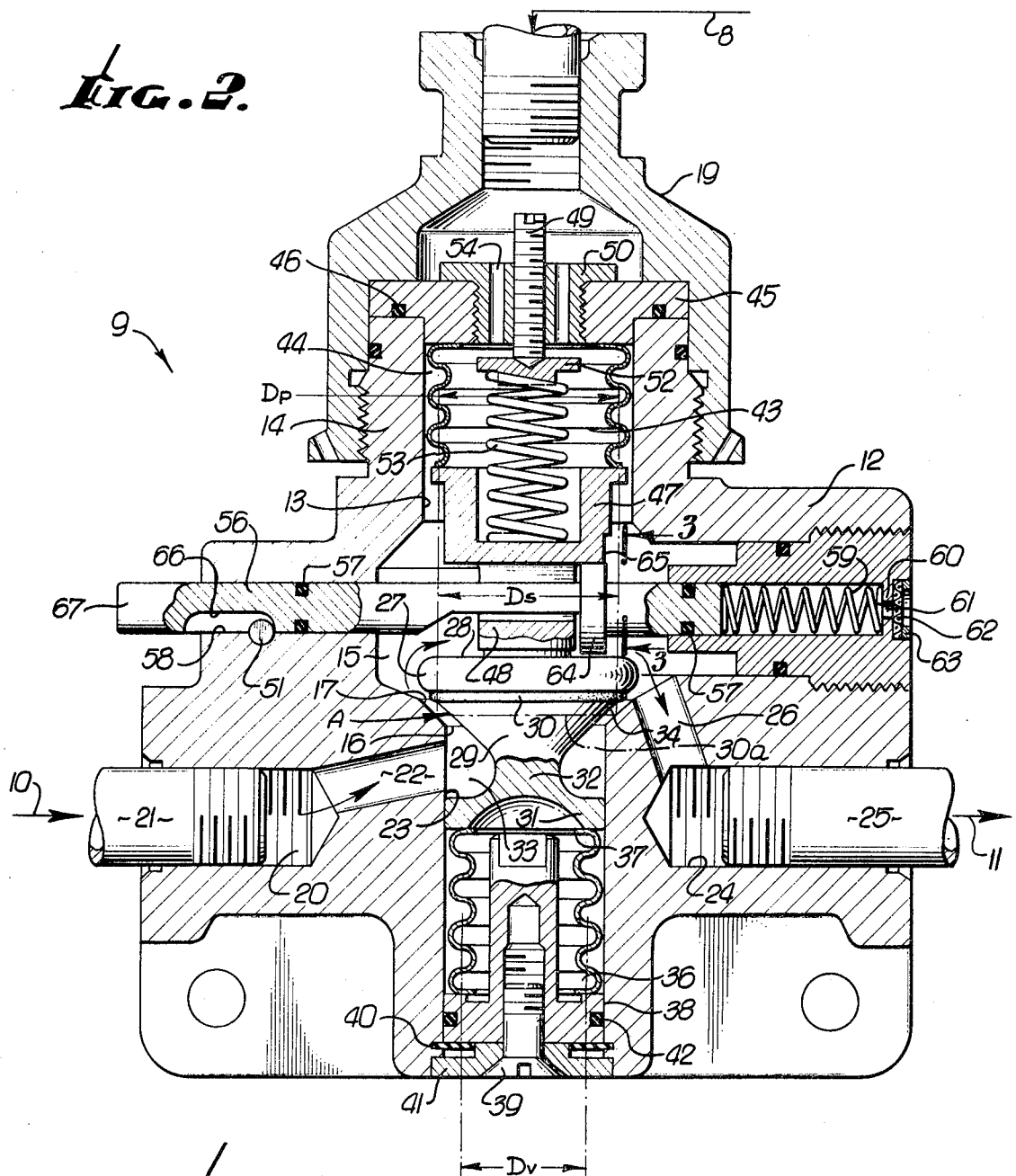
FIG. 2 is an enlarged detail view of a second tank fluid flow control valve responsive to a predetermined ratio of second tank to first tank pressure according to the invention.

With reference now to FIG. 2, the valve 9 is shown in detail. Structurally the valve 9 is seen to comprise a block 12 having a central vertical bore 13 and terminating upwardly in a threaded neck portion 14. The bore 13 has an enlarged intermediate portion forming a valve chamber 15 having a valve opening 16 surrounded by annular beveled valve seat 17. Pilot pressure fluid from line 8 enters the block 12 at neck portion 14. Line 8 is threaded into adapter 19 which is threaded onto the block neck portion 14. Supply No. 2 fluid line 10 enters the block 12 at fluid inlet port 20 laterally of the bore 13 and below the valve chamber 15 secured there by adapter 21 threaded into the port. Passage 22 leads from fluid inlet port 20 to the lower extent 23 of the bore 13 below the valve chamber 15. Supply No. 2 fluid exits from the block 12 at fluid outlet port 24 into line 11 secured to the outlet port by adapter 25. The fluid outlet port 24 is disposed laterally of the bore 13 and communicates with valve chamber 15 through passage 26 leading downwardly through the block 12 from the valve chamber to the fluid outlet port.

Valve body 27, shown in open position in FIG. 2, is provided in the valve chamber 15 to control fluid communication between the inlet and outlet ports 20, 24. The valve body 27 comprises a generally conical upper section 28 shaped and sized to engage the valve seat 17 intermediate the upper section ends and carrying a sealing ring 30 and a lower ring section 31 slidably received in lower bore extent 23 to guide the valve body movement vertically. Sealing ring 30 engages the valve seat along line 30a which is equal in diameter, $D_s$, to the effective diameter, $D_p$, of upper bellows 43, as will be explained below. Valve body 27 further includes an intermediate reduced diameter section 32 between the valve upper and lower sections 28 and 31 respectively, and opposite passage 22 defining with lower bore extent 23 an annular chamber 33.

The valve body 27 is subject to upward force by virtue of the presence of pressurized Supply No. 2 fluid in chamber 33. The force is proportioned by the net effective area A of the conical surface 29 acted on by the fluid below the valve sealing line 30a as will be described. A downward force on valve body 27 is provided by the provision of aneroid bellows 36 within the bore lower extent 23 and below the valve lower section 31. This bellows interiorly is at hard vacuum and accordingly seeks to contract under external pressure. The bellows free end 37 is secured to the valve lower portion 31 by any convenient means. The opposite end of the bellows 36 is adjustably fixed relative to the bore lower extent 23 by the head of tee-fitting 38 into which screw 39 is threaded through retaining ring 40 and retainer 41. The tee-fitting 38 head is sealed with the bore lower extent 23 by suitable O-ring seal 42.

The valve body 27 is subjected to a principal downward force exerted by pressurized fluid from Supply No. 1. Fluid from tank 3 (Supply No. 1) is passed into the valve block 12 through line 8 to exert a force on valve body 27 as follows: A fluid-receiving bellows 43 is mounted in upper bore extent 44 with its fixed end fitting 45 clamped between adapter 19 and the top of block neck portion 14 with appropriate sealing by ring 46. A bellows free end fitting 47 suitably cup-shaped as shown, for purposes to appear, and carrying actuating rod 48 closes the opposite end of the bellows 43. Actuating rod 48 is secured to valve body upper section 28 to transmit axial movement of bellows 43 to the valve body 27. Bellows 43 calibration for particular devices is provided by adjustment screw 49 carried by bushing 50 in fixed end fitting 45 to act against spring retainer 52 and thus adjustment spring 53 set in cuplike free end fitting 47. Bushing 50 is ported at 54 to permit fluid pressure sensing within the bellows 43.

The effective diameter $D_p$ of bellows 43 will determine the force applied to valve body 27 by this bellows at a given fluid pressure at Supply No. 1, in tank 2. The smaller the diameter of bellows 43 the less the effective area of fluid pressure application and thus the smaller the force on the valve body 27, and conversely an increased effective area for the bellows 43 will increase downward force on the valve body for a given Supply No. 1 fluid pressure. The downward force derived from fluid pressure in tank 2 may thus be proportioned by appropriate control of bellows 43 effective area. The upward force on the valve body 27 derived from Supply No. 2 fluid pressure may be proportioned by appropriate dimensioning of the conical surface portion 34 below the valve seating ring 30 to define a desired effective area A. Effective area $A$ is defined by the difference between aneroid bellows 36 diameter $D_r$ and pilot pressure bellows 43 diameter $D_p$, thus, $$A=(D_p{}^2-D_r{}^2)\pi/4$$

In preferred embodiments, the sealing line 30a diameter $D_s$ equals $D_p$ so $$A=(D_s{}^2-D_r{}^2)\pi/4$$

Accordingly, surface portion 34 lying between the concentric cylindrical figures having diameters $D_p=D_s$ and $D_r$ will have an effective area of $A$. With the effective area of the fluid receiving bellows 43 equal to the effective area of valve seat 17, a circle seen in FIG. 2 as sealing line 30a, the upward force of the back pressure of fluid in line 4 tending to compress bellows 43 is exactly equal to downward force of the line 4 fluid back pressure acting on the top of valve body 27 tending to compress bellows 36 so that these forces cancel out and back pressure variations in line 4 do not affect the valve 9 operation.

The valve body 27 is subjected to forces derived from fluid pressure in Supply No. 1 and Supply No. 2 simultaneously and oppositely. A greater upward force will displace the valve body 27 and thus open the valve to fluid flow from tank 3 (Supply No. 3). This will cause a rise in the fluid back pressure in discharge line 4 and thus cause check valve 7 in line 6 to close, whenever the fluid pressure in tank 2 is exceeded.

While the valve 9 may be designed to open whenever the pressure in Supply No. 2 exceeds the pressure in Supply No. 1, the valve 9 as depicted is adapted to operate at predetermined pressure ratios without regard to the absolute pressure in tank 3 to the fluid pressure in tank 2 is 1.9 or any other ratio value. This is highly useful where two pressurized tanks are to be used. Fluid supply from the first tank is continued until the first tank pressure falls below the second tank pressure in a certain ratio predetermined by the forces which the valve body in the valve is subjected. That is, the downward force is proportioned to its fluid supply (No. 1) pressure and the upward force is proportioned to its fluid supply (No. 2) pressure by the arrangement of valve ports with the upward and downward forces being differently proportioned to produce a ratio of forces on the valve body of some preselected value.

In general, where $x$ is a given ratio of inlet port pressure to pilot pressures to be maintained i.e., $x=P_l/P_p$, the ratio of diameters may be derived from the expression $D_p{}^2/D_r{}^2=x/(x-1)$ where $D_p$ is the effective diameter of the pilot pressure reference bellows and is equal to $D_s$ the effective valve seat diameter, and $D_r$ is the effective diameter of the aneroid bellows. For example, in an apparatus having a valve 9 as shown in FIG. 2, tanks 2 and 3 each initially having a fluid pressure of 125 p.s.i.a., $F_s$ is the sealing force in pounds on the valve body 27 and $P_r$ is the pressure in aneroid bellows 36 (=0 p.s.i.a.), then the condition at which the valve 9 starts to open (sealing force, $F_s=0$) is represented by the equation $$F_s=(P_l-P_p)\pi/4\,D_p{}^2-P_l\,\pi/4\,D_r{}^2=0$$

from which it may be determined that for the valve 9 to open at a pressure ratio of $P_l$ to $P_p$ of e.g., 1.9 the ratio of the reference effective diameters $D_p$ to $D_r$ is $\sqrt{1.9/0.9}=\sqrt{2.11}$ =1.45 and that under these conditions the valve 9 will open whenever the ratio of Supply No. 2 pressure to Supply No. 1 pressure is 1.9 e.g., 125 p.s.i.a. to 65.8 p.s.i.a. or 30 p.s.i.a. to 15.8 p.s.i.a. and always at the same ratio through out the pressure range.

Figure 3:
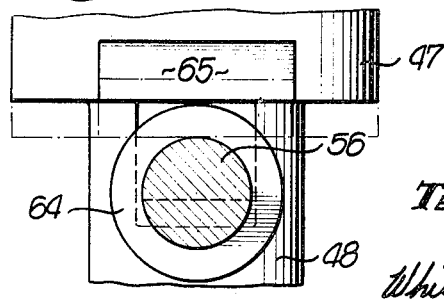
FIG. 3 is a view of the control valve locking pin taken along line 3—3 in FIG. 2.

When opened, the valve body 27 may be locked in position to require a manual reset. Thus reset pin 56 is provided sealed with O-rings 57 in transverse bore 58 through the block 12. Reset pin 56 is biased leftward by return spring 59 supported by annular rib 60 having a central vent 61 covered by vent screen 62 held in the bore by staked washer 63. When valve body 27 is in closed position, reset pin 56 is in its extreme right position with pin shoulder 64 engaging cooperating shoulder 65 on free end fitting 47 of the bellows 43. When this fitting 47 lifts with valve body 27, the reset pin 56 is pushed leftward by spring 59 as the pin shoulder 64 clears under the fitting. A stop 51 in groove 66 of pin 56 limits leftward movement of the pin with the pin shoulder 64 in locking engagement under fitting 47 (FIGS. 2, 3) against return movement of the fitting and thus closing movement of the valve body 27 into the valve opening 16 until projecting tab 67 of the reset pin is manually pushed to reset the valve.

I claim:

1. System for the delivery of rain repelling fluid onto an aircraft windshield including:
    a. conduit leading onto said windshield.
    b. a first tank of fluid under pressure for delivery to said conduit.
    c. a second tank of fluid under pressure for delivery to said conduit.

d. a valve to control first tank delivery to said conduit and adapted to close when conduit pressure is greater than the first tank pressure to cutoff first tank delivery to the conduit,
e. valve means including a valve member responsive to first tank pressure and second tank pressure to control second tank delivery to said conduit,
f. a fluid receiving bellows interiorly in open communication with first tank fluid and having a free end operatively connected to one side of said valve member to communicate first tank fluid pressure to said valve member, and
g. means communicating second tank fluid pressure to the opposite side of said valve member whereby said valve member responds to second tank fluid pressure relatively higher than first tank fluid pressure to permit second tank delivery to said conduit.

2. Fluid delivery system according to claim 1, including also a second bellows having a free end operatively connected to said valve member opposite said fluid receiving bellows for urging the valve member cooperatively with said fluid receiving bellows.

3. Fluid delivery system according to claim 1, in which means (f) and (g) are arranged to operate said valve means responsive to a predetermined ratio of second tank pressure to first tank pressure.

4. Fluid delivery system according to claim 3, in which said bellows means (f) communicates a force proportional to the first tank pressure to one side of said valve member and means (g) communicates a force proportional to the second tank pressure to the opposite side of said valve member, said forces being differently proportional to their respective tank pressures.

5. Fluid delivery system according to claim 4 including also means releasably blocking return movement of the valve member following second tank discharge into the line.

6. Fluid delivery system according to claim 4, in which said fluid receiving bellows has a predetermined effective area proportioning the force on said valve member from said first tank fluid pressure, and said valve member has a surface on its opposite side in open communication with second tank fluid, said surface having a predetermined effective area proportioning the force on said valve member opposite side from said second tank fluid pressure, the ratio of said bellows effective area to said valve member effective surface area defining said predetermined pressure ratio.

7. Fluid delivery system according to claim 6, in which the effective diameter of said fluid receiving bellows is equal to the effective seat diameter of the valve opening.

8. Fluid delivery system according to claim 6, including also aneroid bellows having a free end connected to said opposite side of the valve member and operative to bias said valve member cooperatively with said fluid receiving bellows against the proportioned force of second tank fluid pressure on said valve member.

* * * * *